(12) United States Patent
Li et al.

(10) Patent No.: US 12,524,863 B2
(45) Date of Patent: Jan. 13, 2026

(54) PRODUCT RECOGNITION METHOD, MODEL TRAINING METHOD, DEVICE AND ELECTRONIC DEVICE

(71) Applicant: Beijing Baidu Netcom Science Technology Co., Ltd., Beijing (CN)

(72) Inventors: Shuo Li, Beijing (CN); Feng Huang, Beijing (CN); Lei Nie, Beijing (CN); Xuepeng Zhao, Beijing (CN); Luyan Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 383 days.

(21) Appl. No.: 18/181,967

(22) Filed: Mar. 10, 2023

(65) Prior Publication Data

US 2023/0214985 A1 Jul. 6, 2023

(30) Foreign Application Priority Data

Mar. 25, 2022 (CN) .......................... 202210298190.4

(51) Int. Cl.
*G06T 7/00* (2017.01)
(52) U.S. Cl.
CPC .. *G06T 7/0004* (2013.01); *G06T 2207/20081* (2013.01)
(58) Field of Classification Search
CPC ... G06F 18/214; G06F 18/2413; G06N 3/045; G06N 3/0464; G06N 3/088; G06N 3/09;
(Continued)

(56) References Cited

U.S. PATENT DOCUMENTS

2015/0238148 A1* 8/2015 Georgescu .............. G06F 18/28
600/408
2017/0103532 A1* 4/2017 Ghesu .................. A61B 5/7264
(Continued)

FOREIGN PATENT DOCUMENTS

CN 110378869 A 10/2019
CN 110726724 A * 1/2020 ......... G01N 21/8854
(Continued)

OTHER PUBLICATIONS

Guanghua Hu et al., "Unsupervised fabric defect detection based on a deep convolutional generative adversarial network," Jul. 17, 2019, Textile Research Journal, 2020, vol. 90(3-4), pp. 247-267.*
(Continued)

*Primary Examiner* — Omar S Ismail
(74) *Attorney, Agent, or Firm* — Hunton Andrews Kurth LLP

(57) ABSTRACT

A product recognition method and device, a model training method and device, and an electronic device are provided. The product recognition method includes: obtaining image data of a product; performing defect recognition on the image data based on a first recognition model, to obtain a first recognition result, wherein the first recognition model is configured to recognize a defective product; performing qualification recognition on the image data based on a second recognition model to obtain a second recognition result, wherein the second recognition model is configured to recognize a qualified product; determining a target recognition result of the product based on the first recognition result and the second recognition result.

20 Claims, 6 Drawing Sheets

(58) Field of Classification Search
CPC . G06T 2207/20081; G06T 2207/20084; G06T 2207/30164; G06T 7/0004; G06V 10/774
See application file for complete search history.

(56) References Cited

U.S. PATENT DOCUMENTS

| | | | |
|---|---|---|---|
| 2017/0116497 A1* | 4/2017 | Georgescu | G06N 3/006 |
| 2018/0211374 A1* | 7/2018 | Tanaka | G06V 10/945 |
| 2019/0155164 A1 | 5/2019 | Chen et al. | |
| 2019/0244513 A1* | 8/2019 | Niculescu-Mizil | G06V 10/764 |
| 2020/0160497 A1* | 5/2020 | Shah | G06T 7/13 |
| 2020/0364842 A1* | 11/2020 | Chaton | G06N 3/04 |
| 2021/0166381 A1* | 6/2021 | Yip | G06T 7/37 |
| 2021/0192723 A1* | 6/2021 | Fu | A61M 5/3129 |
| 2022/0036533 A1 | 2/2022 | Xiao et al. | |
| 2022/0138931 A1* | 5/2022 | Palma | G06T 7/174 382/128 |
| 2022/0230301 A1* | 7/2022 | Thomasset | G06T 7/0004 |

FOREIGN PATENT DOCUMENTS

| | | | | |
|---|---|---|---|---|
| CN | 111382785 A | | 7/2020 | |
| CN | 111627015 A | | 9/2020 | |
| CN | 111740991 A | | 10/2020 | |
| CN | 111986178 A | | 11/2020 | |
| CN | 112036514 A | | 12/2020 | |
| CN | 112288034 A | | 1/2021 | |
| CN | 112581463 A | * | 3/2021 | G06F 18/22 |
| CN | 113361603 A | | 9/2021 | |
| CN | 113763305 A | * | 12/2021 | G06T 7/0002 |
| CN | 114723658 A | * | 7/2022 | G06N 3/045 |
| JP | 2021174194 A | | 11/2021 | |
| WO | 2021214833 A1 | | 10/2021 | |

OTHER PUBLICATIONS

Tian Wang et al.,"A fast and robust convolutional neural network-based defect detection model in product quality control," Aug. 15, 2017, Int J Adv Manuf Technol (2018) 94, pp. 3465-3468.*

Wenqiang Liu et al.,"An Automated Defect Detection Approach for Catenary Rod-Insulator Textured Surfaces Using Unsupervised Learning," Apr. 13, 2020, IEEE Transactions on Instrumentation and Measurement, vol. 69, No. 10, Oct. 2020, pp. 8411-8421.*

Oumayma Essid et al.,"Automatic detection and classification of manufacturing defects in metal boxes using deep neural networks," Nov. 9, 2018, PLOS ONE | https://doi.org/10.1371/journal.pone. 0203192 Nov. 9, 2018, pp. 1-15.*

Sejune Cheon et al.,"Convolutional Neural Network for Wafer Surface Defect Classification and the Detection of Unknown Defect Class," Mar. 4, 2019, IEEE Transactions on Semiconductor Manufacturing, vol. 32, No. 2, May 2019, pp. 163-170.*

Robert Skilton et al.,"Visual Detection of Generic Defects in Industrial Components using Generative Adversarial Networks," Oct. 17, 2019, Proceedings of the 2019 IEEE/ASME, International Conference on Advanced Intelligent Mechatronics, Hong Kong, China, Jul. 8-12, 2019, pp. 489-492.*

Syed Sumera Ershad Ali et al.,"An Eficient Quality Inspection of Food Products Using Neural Network Classification," May 9, 2019, J. Intell. Syst. 2020; 29(1), pp. 1425-1436.*

Extended European Search Report issued in Application No. 23160686.4 on Jun. 23, 2023, 8 pages.

Chinese Office Action issued in Application No. 202210298190.4 on May 11, 2022.

Wenqiang, Liu et al., "An Automated Defect Detection Approach for Catenary Rod-Insulator Textured Surfaces Using Unsupervised Leaming," University of Edinburgh, Jun. 14, 2020, 13 pages.

Siqin Yu, "Dep Generative Model Fusion Based Industrial Visual Defect Detection System," Beijing University of Posts and Telecommunications, Thesis for Master Degree, Jun. 5, 2020, 76 pages.

* cited by examiner

PRODUCT RECOGNITION METHOD, MODEL TRAINING METHOD, DEVICE AND ELECTRONIC DEVICE

CROSS-REFERENCE TO RELATED APPLICATION

This application claims a priority to Chinese Patent Application No. 202210298190.4 filed on Mar. 25, 2022, the disclosures of which are incorporated in their entirety by reference herein.

TECHNICAL FIELD

The present disclosure relates to the field of data processing, particularly relates to the fields of industrial quality inspection, image recognition, and depth learning, and in particular, the present disclosure to a product recognition method, a model training method, a product recognition device, a model training device and an electronic device.

BACKGROUND

Quality inspection in the related art is usually conducted on products after production and processing of the products are completed. Currently, manual quality inspection is mainly adopted, or a quality inspection process of a product is completed by a method of recognizing an image of the product through an image recognition technology.

SUMMARY

A product recognition method, a model training method, a product recognition device, a model training device, and an electronic device are provided.

According to a first aspect of the present disclosure, the present disclosure provides a product recognition method. The method includes: obtaining image data of a product; performing defect recognition on the image data based on a first recognition model, to obtain a first recognition result, wherein the first recognition model is configured to recognize a defective product; performing qualification recognition on the image data based on a second recognition model, to obtain a second recognition result, wherein the second recognition model is configured to recognize a qualified product; determining a target recognition result of the product based on the first recognition result and the second recognition result.

According to a second aspect of the present disclosure, the present disclosure provides a model training method. The method includes: obtaining image data of a product; inputting the image data into an initial recognition model and a second recognition model for recognition, and obtaining a first recognition result outputted by the initial recognition model and a second recognition result outputted by the second recognition model, wherein the initial recognition model is a model for recognizing a defective product, and the second recognition model is a model for recognizing a qualified product; training the initial recognition model based on the image data to obtain a first recognition model, when the first recognition result indicates that the product is a qualified product and the second recognition result indicates that the product is a defective product.

According to a third aspect of the present disclosure, the present disclosure provides a product recognition device. The product recognition device includes: a first obtaining module configured to obtain image data of a product; a first recognition module configured to perform defect recognition on the image data based on a first recognition model, to obtain a first recognition result, wherein the first recognition model is configured to recognize a defective product; a second recognition module configured to perform qualification recognition on the image data based on a second recognition model, to obtain a second recognition result, wherein the second recognition model is configured to recognize a qualified product; a determination module configured to determine a target recognition result of the product based on the first recognition result and the second recognition result.

According to a fourth aspect of the present disclosure, the present disclosure provides a model training device. The model training device includes: a second obtaining module configured to obtain image data of a product; a third recognition module configured to input the image data into an initial recognition model and a second recognition model for recognition, and obtain a first recognition result outputted by the initial recognition model and a second recognition result outputted by the second recognition model, wherein the initial recognition model is a model for recognizing a defective product, and the second recognition model is a model for recognizing a qualified product; a training module configured to train the initial recognition model based on the image data to obtain a first recognition model, when the first recognition result indicates that the product is the qualified product and the second recognition result indicates that the product is the defective product.

According to a fifth aspect of the present disclosure, the present disclosure provides an electronic device. The electronic device includes: at least one processor, and a memory communicatively coupled to the at least one processor, wherein the memory stores instructions executable by the at least one processor, and when the instructions are executed by the at least one processor, the at least one processor executes the product recognition method according to the first aspect or the model training method according to the second aspect.

According to a sixth aspect of the present disclosure, the present disclosure provides a non-transitory computer-readable storage medium storing computer instructions, wherein the computer instructions are configured to cause a computer to execute the product recognition method according to the first aspect, or execute the model training method according to the second aspect.

According to a seventh aspect of the present disclosure, the present disclosure provides a computer program product including a computer program, wherein when the computer program is executed by a processor, the processor implements the product recognition method according to the first aspect, or the model training method according to the second aspect.

In the technical solutions of the present disclosure, in the process of quality inspection of a product, defect recognition of the product is performed based on a first recognition model, and qualification recognition is performed based on a second recognition model, and the target recognition result is determined based on recognition results of the two recognitions, thus the accuracy of the recognition results can be improved.

BRIEF DESCRIPTION OF THE DRAWINGS

The drawings are used to better understand the technical solutions of the present disclosure and do not constitute limitation to the present disclosure.

DETAILED DESCRIPTION

The following description is made for illustrating exemplary embodiments of the present disclosure in conjunction with accompanying drawings, various details of the embodiments of the present disclosure are included therein to aid in understanding and should be considered as being exemplary only. Accordingly, those of ordinary skill in the art will recognize that various changes and modifications may be made to the embodiments described herein without departing from the scope and spirit of the present disclosure. Description of well-known functions and structures is omitted in the following description for purpose of clarity and conciseness.

Figure 1:
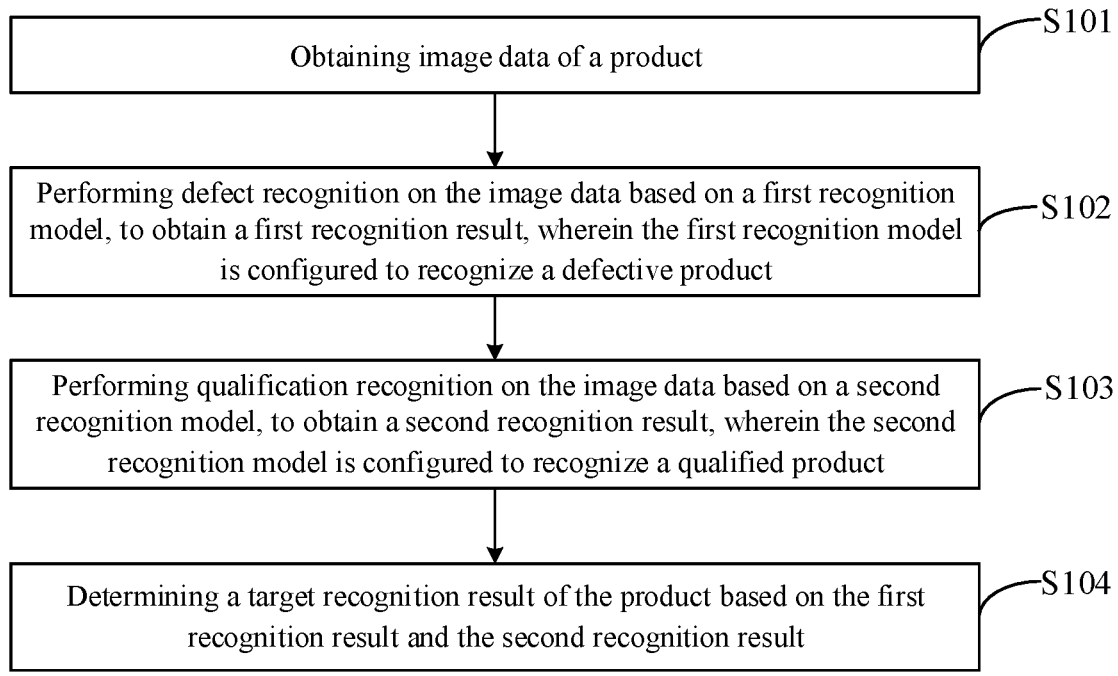
FIG. 1 is a flowchart of a product recognition method provided by embodiments of the present disclosure.

Please referring to FIG. 1, which is a flowchart of a product recognition method provided in embodiments of the present disclosure, the product recognition method includes the following steps S101-S104.

S101: obtaining image data of a product;

S102: performing defect recognition on the image data based on a first recognition model, to obtain a first recognition result, wherein the first recognition model is configured to recognize a defective product;

S103: performing qualification recognition on the image data based on a second recognition model, to obtain a second recognition result, wherein the second recognition model is configured to recognize a qualified product;

S104: determining a target recognition result of the product based on the first recognition result and the second recognition result.

The above-mentioned products may be various products in the industrial field, for example, parts of notebook computers, porcelain, and various devices.

Accordingly, the image data of the product may be image data obtained by photographing the product after the product is produced. The image data may include a plurality of images obtained by photographing the same product at multiple angles.

The first recognition model may be a model obtained by generating samples based on image data of a defective product, and training a previously constructed model based on the generated samples. For example, a training sample set may be generated according to known defect types of a product, and the previously constructed model may be trained based on the generated training sample set, to obtain the first recognition model. In this way, since the first recognition model can learn various relevant characteristics of a product having known defects during training; after the training, when a product having the known defect is recognized through the first recognition model, the product having the known defect can be relatively accurately recognized, and the defect type of the product having the defect can be outputted.

The known defect types may include defect types such as cracks in a product, excessive color deviation of a product, an excessive shape error or an excessive size error of a product, etc.

The second recognition model may be a model obtained by training a previously constructed model using image data of a qualified product as training samples. In this way, the second recognition model obtained after the training may learn feature distribution of the qualified product, and may be capable of distinguishing the qualified product from the defective product.

However, in an actual defect detection scenario, on one hand, a ratio of an amount of defective products to an amount of all produced products is quite low, so it is difficult to collect defect samples. On the other hand, defective products having new defect forms emerge one after another, therefore, in the process of training and obtaining the first recognition model, it is difficult for the generated training sample set to completely include all defect types of the product during generating the first recognition model obtained through the training. Therefore, the first recognition model can generally recognize only the known defect types learned during the training, and new defect types not learned during the training cannot not be accurately recognized. Therefore, in the process of recognizing the image data of the product based on the first recognition model, the first recognition model may output a recognition result that the product is a qualified product when a new defect type is included in the image data of the product, thereby causing a problem that the recognition result is inaccurate.

Based on this consideration, in the embodiments of the present disclosure, when the image data is recognized based on the first recognition model, the image data is further recognized based on the second recognition model. Since characteristics of qualified products are relatively stable, the second recognition model obtained through training based on the qualified products can relatively accurately recognize the qualified products. In this way, by determining a target recognition result based on a first recognition result outputted by the first recognition model and a second recognition result outputted by the second recognition model, accuracy of the determined target recognition result can be improved. For example, in a case where the first recognition result indicates that the product is a qualified product and the second recognition result indicates that the product is a defective product, output may be given based on the second recognition result to improve the accuracy of the recognition result. Further, in the case where the first recognition result indicates that the product is a qualified product and the second recognition result indicates that the product is a defective product, a recognition result indicating that a recognition result is pending may be outputted, in order to remind the relevant personnel to manually review the defect type of the product.

In this embodiment, during the quality inspection of the product, defect recognition is performed on the product based on the first recognition model, and qualification recognition is also performed on the product based on the second recognition model, the target recognition result is determined based on the recognition results in the defect recognition and the qualification recognition, so that the accuracy of the recognition result can be improved.

Optionally, determining the target recognition result of the product based on the first recognition result and the second recognition result includes:

determining that the target recognition result is the first recognition result or the second recognition result when the first recognition result is the same as the second recognition result;

determining that the target recognition result is the first recognition result when the first recognition result indicates that the product is a defective product, and the second recognition result indicates that the product is a qualified product;

determining that the target recognition result is a third recognition result when the first recognition result indicates that the product is a qualified product and the second recognition result indicates that the product is a defective product, wherein the third recognition result is a recognition result that the defect type of the product is pending.

Specifically, in the case where the first recognition result is the same as the second recognition result, that is, in the case where the first recognition result may be an accurate recognition result, the first recognition result or the second recognition result may be directly determined as the target recognition result. The case where the first recognition result is the same as the second recognition result may refer to: a case where both the first recognition result and the second recognition result indicate that the product is a qualified product, or a case where the both the first recognition result and the second recognition result indicate that the product is a defective product.

Correspondingly, when the first recognition result indicates that the product is a defective product, and the second recognition result indicates that the product is a qualified product, since the first recognition model can be relatively accurately recognize the defect type of a known defect, and the second recognition model is a model obtained by training based on qualified products, the second recognition model may not be able to accurately recognize a defective product. Therefore, the first recognition result can be outputted as the target recognition result.

In addition, when the first recognition result indicates that the product is a qualified product, and the second recognition result indicates that the product is a defective product, the image data of the product may include a new defect type or recognition by the second recognition model may be an error. Therefore, the recognition result that the defect type of the product is to be determined may be outputted.

In this embodiment, after the image data is recognized to obtain the first recognition result and the second recognition result, corresponding target recognition results are configured by comparing the first recognition result with the second recognition result and according to different situations that possibly occur in the first recognition result and the second recognition result. In this way, the accuracy of the outputted target recognition result can be improved.

Optionally, after determining the target recognition result of the product based on the first recognition result and the second recognition result, the method further includes:

in a case where the first recognition result indicates that the product is a qualified product and the second recognition result indicates that the product is a defective product, adding the image data to a defect product database, wherein data in the defect product database is configured to optimize the first recognition model.

Specifically, when the image data of the product includes a new defect type, the first recognition model may not learn the relevant characteristics of the new defect type, so the product may be judged as a qualified product. However, the second recognition model can recognize that the product is different from the qualified product. Thus, the product can be judged as a defective product.

Based on this, when the first recognition result indicates that the product is a qualified product, and the second recognition result indicates that the product is a defective product, the image data of the product may include a new defect type, therefore, the image data can be added to the defect product database. Since the image data in the defect product database may include a large number of new defect types, a set of newly added samples can be constructed based on the image data in the defect product database, and the first recognition model is further iteratively trained based on the set of newly added samples, so that the first recognition model can learn relevant characteristics of more defect types, thereby further improving the accuracy of the recognition result of the first recognition model.

In this embodiment, during recognizing the image data of a product based on an initial recognition model and the second recognition model, image data that may include new defect types is added to the defect product database, and a set of newly added samples is constructed based on the image data in the defect product database, and then the initial recognition model is further iteratively trained based on the set of newly added samples, so that the first recognition model obtained through the training can learn relevant characteristics of more defect type, thereby further improving the accuracy of the recognition result of the first recognition model.

Optionally, the first recognition model is a model obtained by training the initial recognition model based on the image data of a target product. The recognition result obtained by recognizing the image data of the target product by the second recognition model is that the target product is the defective product; the recognition result obtained by recognizing the image data of the target product by the initial recognition model is that the target product is the qualified product; the initial recognition model is a model used to recognize the defective product.

The initial recognition model can be a model obtained by: generating samples based on image data of defective products and training a pre-built model based on the generated samples.

The image data of the target product may include new defect types in the case that the initial recognition model recognizes the image data of the target product as a qualified product and the second recognition model recognizes the image data of the target product as a defective product. Therefore, the image data of the target product can be further reviewed to determine whether it includes new defect types. If the image data of the target product includes new defect types, the initial recognition model can be further iteratively trained based on the image data of the target product, so that the first recognition model obtained through the training can recognize more types of product defects.

In this embodiment, further iterative training is carried out on the initial recognition model based on the image data of the target product when it is determined that the image data of the target product includes new defect types, so that the first recognition model obtained through the training can recognize more types of product defects.

Optionally, the second recognition model is a model obtained by unsupervised training based on image data of qualified products.

The second recognition model can be a model obtained by unsupervised training of a second initial model based on image data of qualified products. Model parameters of the second initial model match model parameters of a pre-training model, where the pre-training model is a model obtained from an open source data set, or the pre-training model is a model obtained by self-supervised training based on artificial defect types.

After the second recognition model is obtained through training, the second recognition model can learn a feature distribution of qualified products. In a process of recognizing image data by using the second recognition model, a Mahalanobis distance, a Euclidean distance and the like can be calculated for feature comparison to determine a product defect type in the image data, and the second recognition model can provide a pixel-level defect determination result.

Specifically, unsupervised training can be conducted on the pre-constructed second initial model based on image data of a large number of qualified products to obtain the said second recognition model.

In this embodiment, unsupervised training is conducted on the pre-constructed second initial model based on image data of a large number of qualified products. In this way, the second recognition model obtained by training can learn the feature distribution of qualified products and thus have the ability to recognize qualified products.

Optionally, the first recognition model includes a first feature extraction layer, a first recognition layer and a second recognition layer. An input end of the first recognition layer and an input end of the second recognition layer are connected with output ends of the first feature extraction layer.

The first feature extraction layer is configured to extract target features in the image data, and is configured to transmit the target features to the first recognition layer and the second recognition layer, respectively.

The first recognition layer is configured to perform recognition based on the received target features and output a defect location in the image data and output a probability that the product is a defect product; the second recognition layer is configured to perform recognition based on the received target features and output contour information of defects in the image data.

The first recognition model may adopt various types of existing network structures, for example, a detection model Faster RCNN or an instance segmentation model Mask RCNN may be adopted. Specifically, referring to FIG. 3, the first recognition model includes a backbone network (Backbon), a feature pyramid network (Feature Pyramid Networks, FPN), a first recognition layer (Bbox Head) and a second recognition layer (Mask head). The Backbone and the FPN together form the first feature extraction layer.

It is understood that the first recognition result may include the output result of the first recognition layer and the output result of the second recognition layer.

When the output result of the first recognition layer is null and the output results of the second recognition layer are null, the product is determined to be a qualified product; when at least one of the output result of the first recognition layer and the output result of the second recognition layer is not null, the product is determined to be a defective product.

In this embodiment, the first recognition result is outputted by performing recognition on the image data based on the first recognition layer, in order to determine whether the product is a defective product, and to determine a specific position of a defect in the product. In addition, the second recognition result is outputted by performing recognition on the image data based on the second recognition layer, so as to output contour information of the defect, and facilitate further iterative training of the first recognition model according to the contour information of the defect.

Optionally, the second recognition model includes a second feature extraction layer, a third feature extraction layer, a fourth feature extraction layer, and a comparison layer. The second feature extraction layer, the third feature extraction layer, and the fourth feature extraction layer are connected to the comparison layer.

The second feature extraction layer, the third feature extraction layer, and the fourth feature extraction layer are respectively configured to perform feature extraction on the image data, a scale of a feature extracted by the second feature extraction layer, a scale of a feature extracted by the third feature extraction layer, and a scale of a feature extracted by the fourth feature extraction layer are different. The comparison layer is configured to output the recognition result based on the feature extracted by the second feature extraction layer, the feature extracted by the third feature extraction layer, and the feature extracted by the fourth feature extraction layer.

Figure 3:
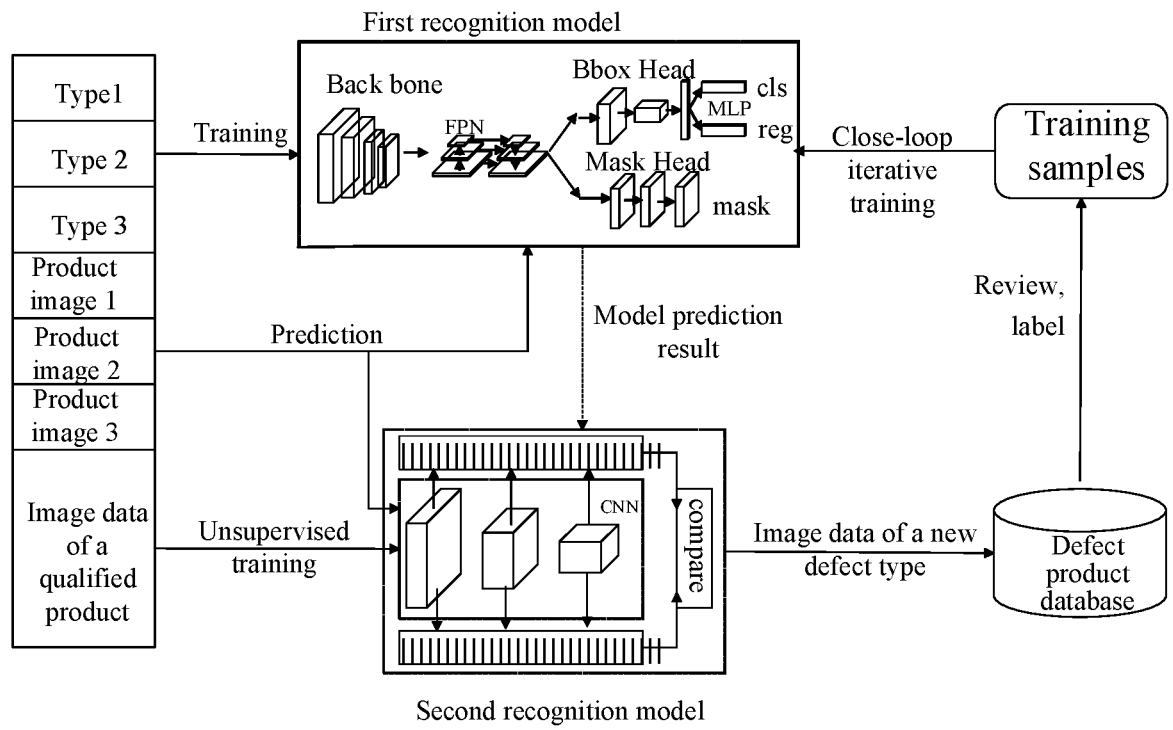
FIG. 3 is a block diagram of a model training framework provided by embodiments of the present disclosure.

The above-mentioned second recognition model is a CNN model as shown in FIG. 3, the CNN model includes three feature extraction layers with different scales, namely, the second feature extraction layer, the third feature extraction layer, and the fourth feature extraction layer configured to extract features of different scales.

In this embodiment, the features of different scales are extracted by the feature extraction layers of three different scales based on the second recognition model. Since the features of different scales contain different details and semantic information, the effect of feature extraction can be improved as compared with extracting single-scale features, and accuracy of recognition results can be improved.

Figure 2:
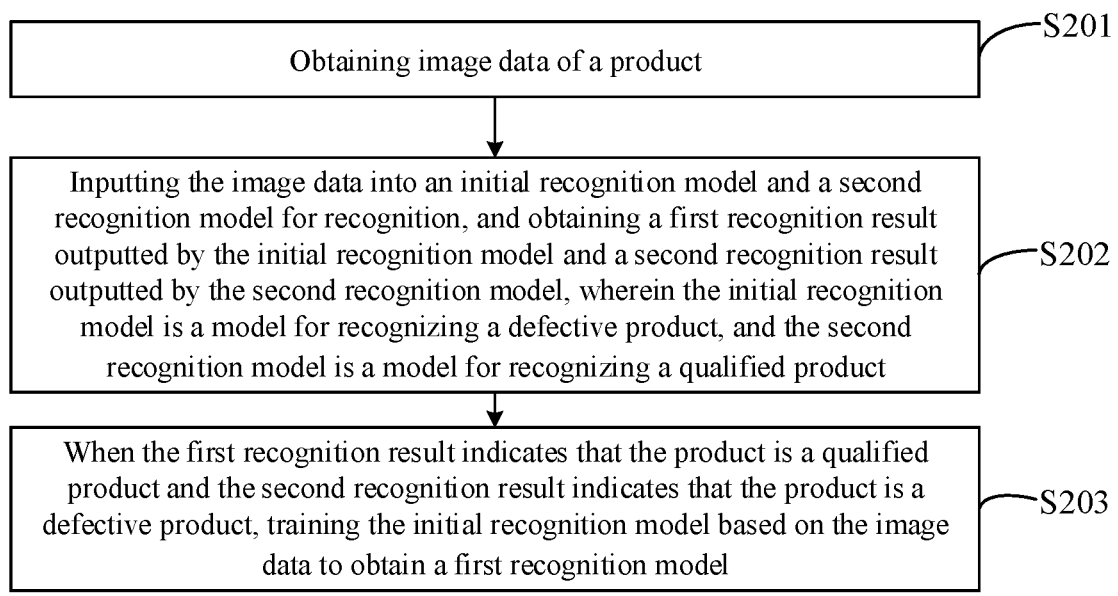
FIG. 2 is a flowchart of a model training method provided by embodiments of the present disclosure.

Referring to FIG. 2, a model training method provided by embodiments of the present disclosure includes the following steps 201-203:

Step S201: obtaining image data of a product;

Step S202: inputting the image data into an initial recognition model and a second recognition model for recognition, and obtaining a first recognition result outputted by the initial recognition model and a second recognition result outputted by the second recognition model, wherein the initial recognition model is a model for recognizing a defective product, and the second recognition model is a model for recognizing a qualified product;

Step S203: in a case where the first recognition result indicates that the product is a qualified product and the second recognition result indicates that the product is a defective product, training the initial recognition model based on the image data to obtain a first recognition model.

The obtaining the image data of the product can be specifically as follows: obtaining the image data in a process of detecting the product, that is, the above-mentioned model training method can be applied to a quality inspection process of the product. That is to say, on one hand, a quality of the product can be inspected based on the initial recognition model and the second recognition model; on the other hand, when the output results of the initial recognition model and the second recognition model indicate that there may be new defect types, the initial recognition model is further iteratively trained based on the new defect types that are excavated, to obtain the first recognition model. After obtaining the first recognition model, the quality of the product can be inspected based on the first recognition model and the second recognition model. In this way, in the process of product quality inspection, new defect types are continuously excavated, and the first recognition model is trained based on the new defect types, so that the model performance of the first recognition model can be continuously improved, and the quality inspection effect can be improved.

The above initial recognition model may be: a model obtained by generating samples based on the image data of a defective product, and training a pre-constructed model based on the generated samples. The above-mentioned second recognition model may be: a model obtained by training a pre-constructed model by using image data of qualified products as training samples.

When the recognition result of performing recognition on the image data of the product by the initial recognition model is that the product is a qualified product, and the recognition result of performing recognition on the image data of the product by the second recognition model is that the product is a defective product, new defect types may be included in the image data of the product. Therefore, the image data of the product can be further reviewed to determine whether the image data includes a new defect type, and if the image data of the product includes a new type of defect, the initial recognition model is further iteratively trained based on the image data of the product, so that the first recognition model obtained through the training can recognize more product defect types.

In this embodiment, when it is determined that the image data of the product includes a new defect type, the initial recognition model is further iteratively trained based on the image data of the product, so that the first recognition model obtained through the training may recognize more product defect types.

Optionally, when the first recognition result indicates that the product is a qualified product, and the second recognition result indicates that the product is a defective product, training the initial recognition model based on the image data to obtain the first recognition model, includes:
  adding the image data to a defect product database;
  generating first training data based on data in the defect product database;
  performing supervised training on the initial recognition model based on the first training data, to obtain the first recognition model.

Specifically, when the image data of the product includes a new defect type, the product may be judged as a qualified product since the initial recognition model fails to learn relevant features of the new defect type. However, the second recognition model can recognize that the product is different from a qualified product, so the product can be judged as a defective product.

Based on this, when the first recognition result indicates that the product is a qualified product, and the second recognition result indicates that the product is a defective product, the image data of the product may include a new defect type, therefore, the image data can be added to the defect product database. Since the image data in the defect product database may include a large number of new defect types, first training data can be generated based on the image data in the defect product database, and the initial recognition model can be further iteratively trained based on the first training data, so that the initial recognition model can learn relevant features of more defect types, thereby further improving the accuracy of the recognition result of the initial recognition model.

In this embodiment, in the process of performing recognition on the image data of the product based on the initial recognition model and the second recognition model, image data that may include new defect types is added to the defect product database, and a new sample set is constructed based on based on the image data in the defect product database, and then the initial recognition model is iteratively trained based on the new sample set, so that the first recognition model obtained through the training can learn relevant features of more defect types, thereby further improving the accuracy of the recognition result of the first recognition model.

Optionally, generating the first training data based on the data in the defect product database, includes:
  obtaining first image data from the defect product database, wherein the first image data is any image data in the defect product database;
  when the first image data is reviewed and a reviewing result indicates that the first image data is the image data of the defective product, setting a defect type label to the first image data, to obtain the first training data.

Reviewing the first image data may specifically include: further reviewing whether the first image data is the image data of a qualified product or the image data of a defective product. For example, the first image data can be reviewed manually. Of course, the first image data can also be recognized based on a pre-trained recognition model, and the recognition result outputted by the pre-trained recognition model is determined as a review result. The recognition model can recognize whether the product corresponding to the first image data is a qualified product.

The above defect type label can specifically label a product defect type of the product in the first image data. It is understandable that, since defect types of products may be different in different first image data, different defect type labels can be configured for different first image data, to obtain multiple first training data. The first training data obtained and original training data generated based on known defect types can be inputted into the initial recognition model for further iterative training, to obtain the first recognition model.

In this embodiment, since a recognition accuracy of the second recognition model usually cannot reach 100%, that is, the second recognition model may recognize the image data of a qualified product in nature as the image data of a defective product. Therefore, there may be image data of a qualified product in the defect product database. Based on this, in this embodiment of the present disclosure, before generating the first training data based on the first image data in the defect product database, the first image data is further reviewed to ensure that the first training data are samples obtained by labelling the image data of the defective product, so as to further improve a model training effect.

Optionally, after obtaining the first image data from the defect product database, the method further includes: reviewing the first image data, and when a result of the reviewing indicates that the first image data is the image data of the qualified product, determining that the first image data as the image data that passes inspection.

In the embodiment, since the result of the reviewing indicates that the first image data is the image data of a qualified product, and the result of recognizing the first image data by the second recognition model is that the product is a defective product, it can be determined that the first image data is the image data, the inspection of which is passed by the second recognition model. In this case, the first image data can be discarded. That is, the first training sample is not generated based on the first image data, and the first image data can be deleted from the defect product database. Thus, it can be ensured that the first training data is the sample obtained by labeling the image data of a defective product, so as to further improve the model training effect.

Optionally, before obtaining the image data of the product, the method further includes:
  obtaining second image data, wherein the second image data is the image data of a qualified product;
  inputting the second image data as training samples into a pre-constructed first initial model for unsupervised training, to obtain the second recognition model.

Specifically, unsupervised training can be conducted on the pre-constructed first initial model based on image data of a large number of qualified products, to obtain the second recognition model. The first initial model can be a variety of existing network models, for example, a Convolutional Neural Networks (CNN) model.

In this embodiment, the unsupervised training is conducted on the pre-constructed first initial model based on a large number of image data of qualified products. In this way, the second recognition model obtained through the training can learn the feature distribution of qualified products and thus have the ability to recognize the qualified products.

Optionally, before obtaining the image data of the product, the method further includes:
  obtaining third image data, wherein the third image data is the image data of the defective product;
  setting a defect type label on the third image data to obtain second training data;
  inputting the second training data into a pre-constructed second initial model for supervised training, to obtain the initial recognition model.

The second initial model can be a variety of existing network models, such as a detection model Faster RCNN or an instance segmentation model Mask RCNN.

It can be understood that the first image data can be the image data of the product storing a first defect type, and the third image data can be the image data of the product storing a second defect type, wherein the first defect type and the second defect type are different defect types. Specifically, the second defect type can be a variety of known defect types, that is, in the process of training the second initial model to obtain the initial recognition model, image data of all known defect types can be obtained first, and defect type labels can be set for the acquired image data to obtain the second training data, and then, supervised training is conducted on the second initial model based on the second training data to obtain the initial recognition model. Accordingly, the first defect type is a newly discovered defect type in the process of recognition based on the initial recognition model.

In this embodiment, the second initial model is trained based on the known defect types, so that the initial recognition model obtained through the training can recognize the image data of the product having a defect.

Optionally, the model parameters of the first initial model match with model parameters of a pre-training model, wherein the pre-training model is a model obtained from an open source dataset, or the pre-training model is a model obtained by self-supervised training based on artificial defect types.

The open source dataset may refer to some disclosed pre-training models in the field of computer vision, wherein the pre-training models in the open source dataset are usually models having been trained based on a massive public dataset, and thus model parameters of the pre-training models may be used as initial training parameters of the first initial model. Thus, the effect of recognition of the constructed first initial model can be improved.

The artificial defect types are artificial defects added to a product image, to obtain image data of an artificial defective product, and self-supervised training on the pre-constructed initial model is performed based on the image data of the artificial defective product to obtain the pre-training model, the model parameters of the pre-training model are determined as initial training parameters of the first initial model, thereby improving the recognition effect of the first initial model.

In this embodiment, by matching the model parameters of the first initial model with the model parameters of the pre-training model, the recognition effect of the constructed first initial model can be improved.

Optionally, in the process of inputting the second image data into the first initial model for unsupervised training, the first initial model is configured to extract the second image data to obtain a feature set. After inputting the second image data into the first initial model constructed in advance and performing unsupervised training to obtain the second recognition model, the method further includes:
  extracting a to-be-recognized feature in test image data based on the second recognition model when the second recognition model receives the test image data;
  determining that the test image data is image data of a qualified product when a distance between the to-be-recognized feature and a feature in a feature set is less than a preset value;
  determining that the test image data is image data of a defective product when a distance between the to-be-recognized feature and a feature in a feature set is larger than or equal to a preset value.

In this embodiment, the second recognition model obtained through training may extract the feature set of qualified products in training data during the training, and extract to-be-recognized features of to-be-recognized image data during recognition or testing, and then distances between the to-be-recognized features and features in the feature set may be calculated, in order to determine whether the to-be-recognized image data is image data of a qualified product, thereby realizing the recognition of the image data.

Optionally, the distance is a Mahalanobis distance or a Euclidean distance.

In this embodiment, the second recognition model may calculate the Mahalanobis distance or the Euclidean distance between the to-be-recognized feature to be recognized and the feature in the feature set, to determine whether the to-be-recognized image data is an image of a qualified product, thereby realizing the recognition of the image data.

Referring to FIG. 3, FIG. 3 is a block diagram of a model training framework provided by embodiments of the present disclosure, the model training framework includes a first recognition model and a second recognition model, and the first recognition model includes a backbone network (Backbone), feature pyramid networks (Feature Pyramid Networks, FPN), a first recognition layer (Bbox Head) and a second recognition layer (Mask head), wherein, the Backbone and the FPN jointly form the first feature extraction layer. The second recognition model is a CNN model, and the CNN model includes three feature extraction layers of different scales for extracting features of different scales. The features of different scales contain different details and semantic information. In respect of extracting single-scale features, the feature extraction effect can be improved, thereby improving the accuracy of recognition results.

At the beginning of model training, training samples can be generated based on the known defect types (Type 1, Type 2 and Type 3) of the products to perform supervised training on the first recognition model, so that the first recognition model obtained through the training has an ability to recognize defective products. At the same time, the second recognition model can be trained based on the image data of qualified products, so that the second recognition model obtained through the training has the ability to recognize qualified products.

Then, the first recognition model and the second recognition model obtained by training can be used as quality inspection models in the quality inspection process, and image data (image data 1, image data 2 and image data 3) of a large amount of to-be-recognized products can be inputted the first recognition model and the second recognition model to perform prediction and obtain the first recognition result outputted by the first recognition model and the second recognition result outputted by the second recognition model. When the first recognition result indicates that the product is qualified product, and the second recognition result indicates that the product is a defective product, the image data is determined as image data of a new defect type, and the image data of the new defect type is added to the defect product database.

Then, the image data in the defect product database can be manually reviewed, and the image data confirmed as new image data of defective products after the reviewing can be labelled to obtain training samples, and iterative training is further performed on the first recognition model based on the training samples. Therefore, during the quality inspection process based on the first recognition model and the second recognition model, new defect types are also discovered synchronously, and a process of iteratively training the first recognition model based on the new defect types is realized.

Compared with manual quality inspection, the technical solution of the present disclosure can save a lot of labor costs, and quality inspection data can be summarized, effective feedback information can be obtained, and a model can be further optimized based on the obtained feedback information. Compared with a traditional image processing method, the technical solution of the present disclosure has advantages of weak dependence on rules, strong robustness, and the like. Specifically, because traditional image processing methods generally have strong dependence on rules and are only effective for defects of a specific form, the unsupervised method of the technical solution of the present disclosure does not depend on rules and only detects anomalies, and can capture defect features of various different forms Therefore, in addition, when a traditional supervised deep learning model is applied to industrial defect detection, a large number of defect samples need generally to be collected and labelled before training the model, and defect forms that have not participated in the training are often missed during inspection. When implementing an actual project, many types of defects have a low occurrence frequency, and it is difficult to collect a large amount of training data from massive data. However, the technical solution of the present disclosure can effectively recall a small amount of serious and difficult-to-collect defects through unsupervised models in actual scenarios. A small amount of manual review is configured to iterate a supervised model, thereby forming a closed loop, making a detection ability of the supervised model more and more robust through a lowest possible labor cost.

Figure 4:
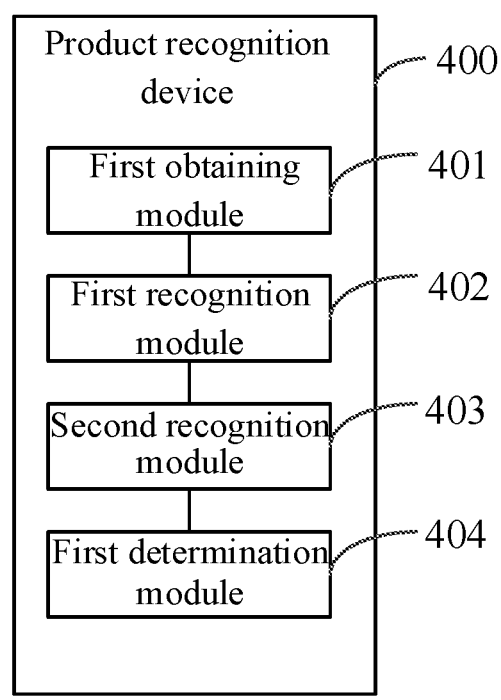
FIG. 4 is a first structural schematic diagram of a product recognition device provided by embodiments of the present disclosure.

Referring to FIG. 4, FIG. 4 is a structural schematic diagram of a product recognition device 400 provided by the embodiments of the present disclosure. The product recognition device 400 includes:

a first obtaining module 401, configured to obtain image data of a product;

a first recognition module 402, configured to perform defect recognition on the image data based on a first recognition model, to obtain a first recognition result, wherein the first recognition model is configured to recognize a defective product;

a second recognition module 403, configured to perform qualification recognition on the image data based on a second recognition model, to obtain a second recognition result, wherein the second recognition model is configured to recognize a qualified product;

a first determination module 404, configured to determine a target recognition result of the product based on the first recognition result and the second recognition result.

Optionally, the first determination module 404 is configured to determine that the target recognition result is the first recognition result or the second recognition result when the first recognition result is the same as the second recognition result.

The first determination module 404 is further configured to determine that the target recognition result is the first recognition result when the first recognition result indicates that the product is a defective product, and the second recognition result indicates that the product is a qualified product.

The first determination module 404 is further configured to determine that the target recognition result is a third recognition result when the first recognition result indicates that the product is a qualified product and the second recognition result indicates that the product is a defective product, wherein the third recognition result is a recognition result that the defect type of the product is pending.

Figure 5:
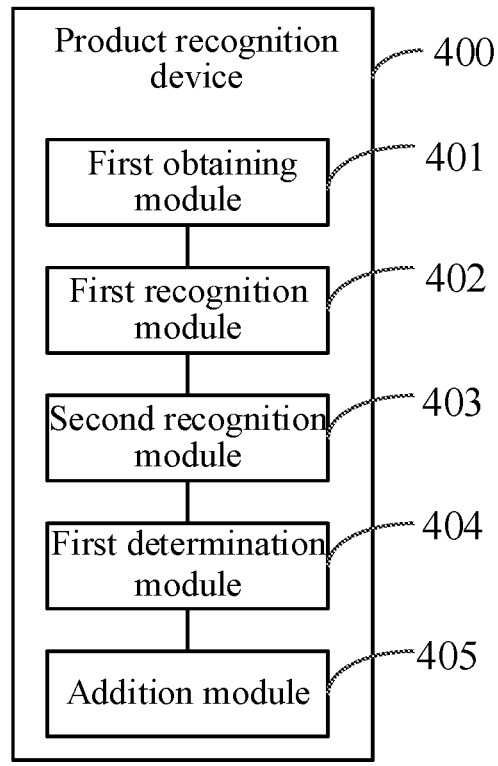
FIG. 5 is a second structural schematic diagram of a product recognition device provided by embodiments of the present disclosure.

Optionally, referring to FIG. 5, the device further includes an addition module 405 configured to, in a case where the first recognition result indicates that the product is a qualified product and the second recognition result indicates that the product is a defective product, add the image data to a defect product database, wherein data in the defect product database is configured to optimize the first recognition model.

Optionally, the first recognition model is a model obtained by training the initial recognition model based on the image data of a target product. The recognition result obtained by recognizing the image data of the target product by the second recognition model is that the target product is the defective product; the recognition result obtained by recognizing the image data of the target product by the initial recognition model is that the target product is the qualified product; the initial recognition model is a model used to recognize the defective product.

Optionally, the second recognition model is a model obtained by unsupervised training based on image data of qualified products.

Optionally, the first recognition model includes a first feature extraction layer, a first recognition layer and a second recognition layer. An input end of the first recognition layer and an input end of the second recognition layer are connected with output ends of the first feature extraction layer.

The first feature extraction layer is configured to extract target features in the image data, and is configured to transmit the target features to the first recognition layer and the second recognition layer, respectively.

The first recognition layer is configured to perform recognition based on the received target features and output a defect location in the image data and output a probability that the product is a defect product; the second recognition layer is configured to perform recognition based on the received target features and output contour information of defects in the image data.

Optionally, the second recognition model includes a second feature extraction layer, a third feature extraction layer, a fourth feature extraction layer, and a comparison layer. The second feature extraction layer, the third feature extraction layer, and the fourth feature extraction layer are connected to the comparison layer.

The second feature extraction layer, the third feature extraction layer, and the fourth feature extraction layer are respectively configured to perform feature extraction on the image data, a scale of a feature extracted by the second feature extraction layer, a scale of a feature extracted by the third feature extraction layer, and a scale of a feature extracted by the fourth feature extraction layer are different. The comparison layer is configured to output the recognition result based on the feature extracted by the second feature extraction layer, the feature extracted by the third feature extraction layer, and the feature extracted by the fourth feature extraction layer.

It should be noted that the product recognition device 400 provided in this embodiment can realize all the technical solutions of the above embodiments of the product recognition method, at least all the above technical effects of the technical solutions can be achieved, which will not be described here.

Figure 6:
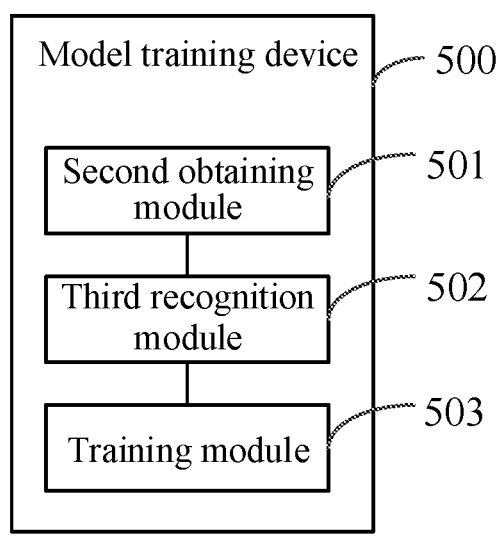
FIG. 6 is a first structural schematic diagram of a model training device provided by embodiments of the present disclosure.

Referring to FIG. 6, FIG. 6 is a structural schematic diagram of a model training device 500 provided by the embodiments of the present disclosure. The model training device 500 includes:
- a second obtaining module 501, configured to obtain image data of a product;
- a third recognition module 502, configured to input the image data into an initial recognition model and a second recognition model for recognition, and obtain a first recognition result outputted by the initial recognition model and a second recognition result outputted by the second recognition model, wherein the initial recognition model is a model for recognizing a defective product, and the second recognition model is a model for recognizing a qualified product;
- a training module 5203, configured to, in a case where the first recognition result indicates that the product is a qualified product and the second recognition result indicates that the product is a defective product, train the initial recognition model based on the image data to obtain a first recognition model.

Figure 7:
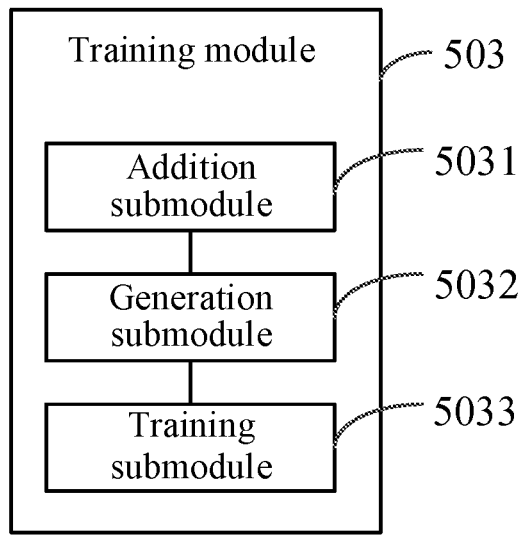
FIG. 7 is a structural schematic diagram of a training module in a model training device in the embodiments of the present disclosure.

Optionally, referring to FIG. 7, the training module 503 includes:
- an addition submodule 5031, configured to add the image data to a defect product database;
- a generation submodule 5032, configured to generate first training data based on data in the defect product database;
- a training submodule 5033, configured to perform supervised training on the initial recognition model based on the first training data, to obtain the first recognition model.

Optionally, the generation submodule 5032 includes:
- an obtaining unit 50321, configured to obtain first image data from the defect product database, wherein the first image data is any image data in the defect product database;
- a setting unit 50322, configured to, when the first image data is reviewed and a reviewing result indicates that the first image data is the image data of the defective product, set a defect type label to the first image data, to obtain the first training data.

Optionally, the generation submodule 5032 further includes a determination unit 50323, configured to review the first image data, and when a result of the reviewing indicates that the first image data is the image data of the qualified product, determine that the first image data as the image data that passes inspection.

Figure 8:
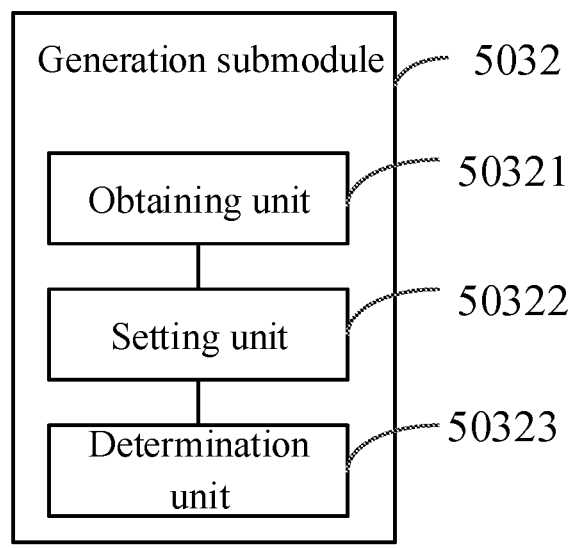
FIG. 8 is a structural schematic diagram of a generation sub-module in a model training device in the embodiments of the present disclosure.

Optionally, as shown in FIG. 8, the generating submodule 5032 includes:
- an obtaining unit 50321, configured to obtain first image data from the defect product database, wherein the first image data is image data of a defective product;
- a setting unit 50322, configured to set a defect type label to the first image data, to obtain the first training data.

Figure 9:
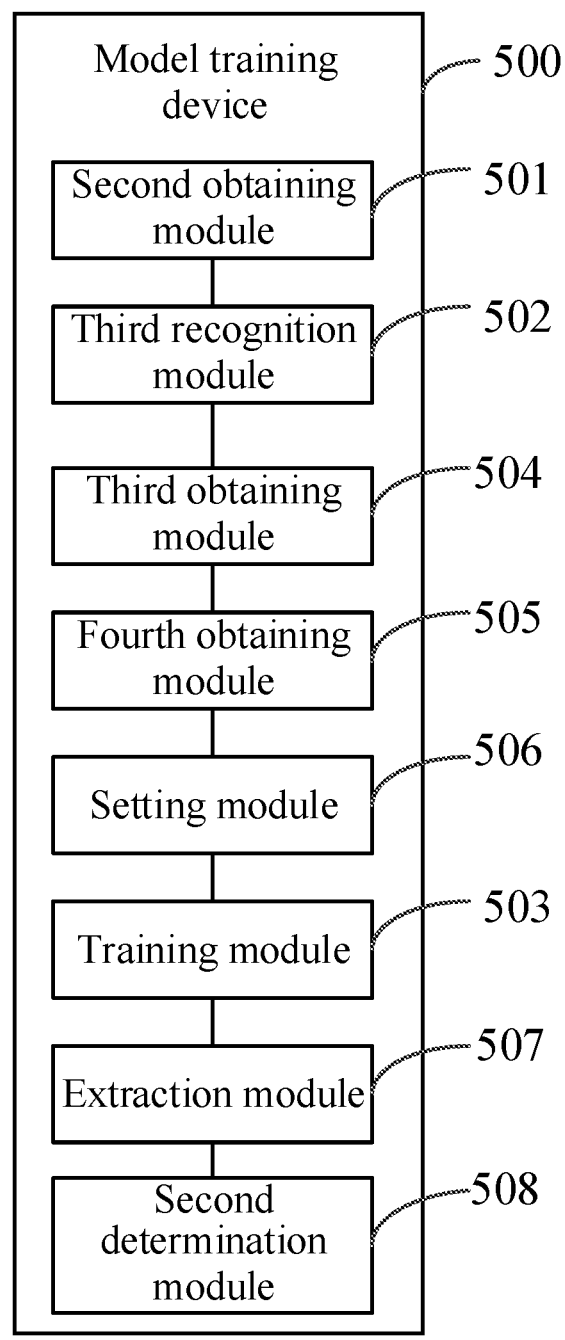
FIG. 9 is a second structural schematic diagram of a model training device provided by the embodiments of the present disclosure.

Optionally, referring to FIG. 9, the device further includes: a third obtaining module 504, configured to obtain second image data, wherein the second image data is the image data of a qualified product; wherein the training module 503 is further configured to input the second image data as training samples into a pre-constructed first initial model for unsupervised training, to obtain the second recognition model.

Optionally, referring to FIG. 9, the device further includes:
- a fourth obtaining module 505, configured to obtain third image data, wherein the third image data is the image data of the defective product;
- a setting module 506, configured to set a defect type label on the third image data to obtain second training data;
- wherein the training module 503 is further configured to input the second training data into a pre-constructed second initial model for supervised training, to obtain the initial recognition model.

Optionally, the model parameters of the first initial model match with model parameters of a pre-training model, wherein the pre-training model is a model obtained from an open source dataset, or the pre-training model is a model obtained by self-supervised training based on artificial defect types.

Optionally, the device further includes:
- an extraction module 507, configured to input the second image data into the first initial model for unsupervised training, the first initial model is configured to extract the second image data to obtain a feature set, wherein the extraction module 507 is further configured to extract a to-be-recognized feature in test image data based on the second recognition model when the second recognition model receives the test image data;

a second determination module 508, configured to determine that the test image data is image data of a qualified product when a distance between the to-be-recognized feature and a feature in a feature set is less than a preset value, and determine that the test image data is image data of a defective product when a distance between the to-be-recognized feature and a feature in a feature set is larger than or equal to a preset value.

Optionally, the distance is a Mahalanobis distance or a Euclidean distance.

It should be noted that the model training device 500 provided in this embodiment can implement all the technical solutions of the embodiments of the above model training method, at least all the above technical effects can be realized, which is not repeated here.

In the technical solution of the present disclosure, acquisition, storage and application of user's personal information are in compliance with provisions of relevant laws and regulations, and do not violate public order and good customs.

According to embodiments of the present disclosure, the present disclosure also provides an electronic device, a readable storage medium, and a computer program product.

Figure 10:
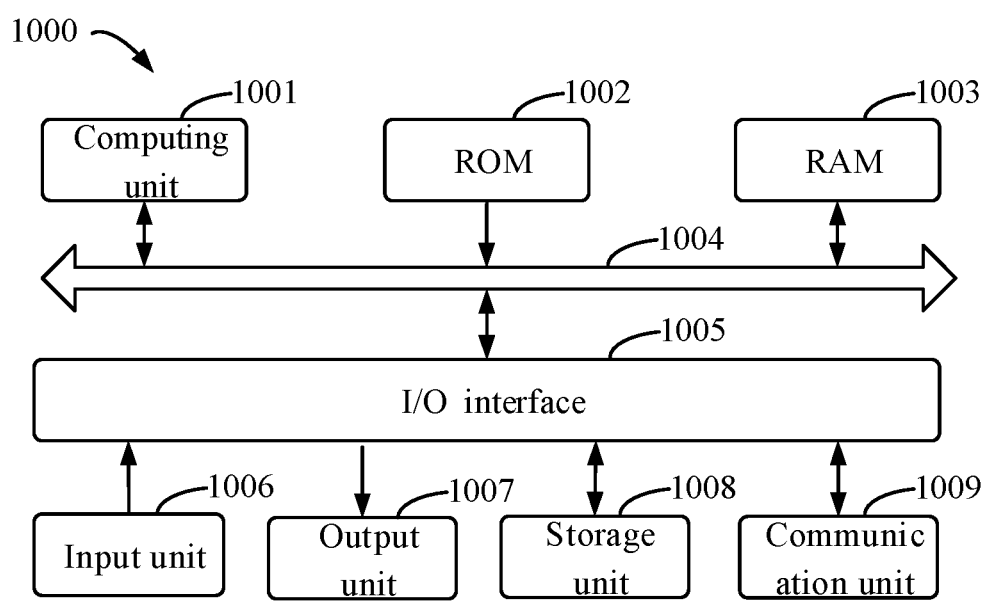
FIG. 10 is a block diagram of an electronic device for implementing a product recognition method or a model training method provided by embodiments of the present disclosure.

FIG. 10 shows a schematic block diagram of an example electronic device 1000 that may be used to implement embodiments of the present disclosure. Electronic devices are intended to represent various forms of digital computers, such as, laptop computers, desktop computers, workstations, personal digital assistants, servers, blade servers, mainframe computers, and other suitable computers. The electronic devices may also represent various forms of mobile devices such as personal digital assistance, cellular telephones, smart phones, wearable devices, and other similar computing devices. The components shown herein, connections and relationships of the components, and functionality of the components are used as examples only, and are not intended to limit the implementations of the present disclosure described and/or claimed herein.

As shown in FIG. 10, the electronic device 1000 includes a computing unit 1001, which may perform various appropriate actions and processes according to a computer program stored in a Read Only Memory (ROM) 1002 or a computer program loaded into a Random Access Memory (RAM) 1003 from a storage unit 1008. Various programs and data necessary for the operation of the electronic device 1000 may also be stored in the RAM 1003. The computing unit 1001, the ROM 1002, and the RAM 1003 are connected to each other through a bus 1004. An input/output (I/O) interface 1005 is also connected to the bus 1004.

A plurality of components in the electronic device 1000 are connected to the I/O interface 1005, the components include: an input unit 1006 such as a keyboard, a mouse, or the like; an output unit 1007 such as various types of displays, speakers, or the like; the storage unit 1008 such as a magnetic disk, an optical disk, or the like; and a communication unit 1009 such as a network card, a modem, a wireless communication transceiver, or the like. A communication unit 1009 allows the device 1000 to exchange information/data with other devices through a computer network such as the Internet and/or various telecommunication networks.

The computing unit 1001 may be a variety of general-purpose and/or special-purpose processing components with processing and computing capabilities. Some examples of the computing unit 1001 include, but are not limited to, a central processing unit (CPU), a graphics processing unit (GPU), various specialized artificial intelligence (AI) computing chips, various computing units running machine learning model algorithms, Digital Signal Processors (DSP), and any suitable processors, controllers, microcontrollers, and the like. The computing unit 1001 performs various methods and processes described above such as a product recognition method or a model training method. For example, in some embodiments, the product recognition method or the model training method may be implemented as a computer software program which is tangibly contained in a machine-readable medium such as the storage unit 1008. In some embodiments, part or all of the computer program may be loaded and/or installed on the device 1000 via the ROM 1002 and/or the communication unit 1009. When a computer program is loaded into the RAM 1003 and executed by the computing unit 1001, one or more steps of the product recognition method or the model training method described above are performed. Optionally, in other embodiments, the computing unit 1001 may be configured to perform the product recognition method or the model training method by any other suitable means (e.g. by means of firmware).

Various embodiments of the systems and techniques described above herein may be implemented in digital electronic circuitry systems, integrated circuit systems, field programmable gate arrays (FPGA), application specific integrated circuits (ASIC), Application Specific Standard Parts (ASSP), system-on-chip systems (SOC), load programmable logic devices (CPLD), computer hardware, firmware, software, and/or combinations thereof. These various embodiments may include embodiments embodied in one or more computer programs. The one or more computer programs may be executed and/or interpreted on a programmable system including at least one programmable processor. The programmable processor, which may be a special purpose or general purpose programmable processor, may receive data and instructions from a storage system, at least one input device, and at least one output device, and transmit data and instructions to the storage system, the at least one input device, and the at least one output device.

Program codes for implementing the methods of the present disclosure may be written in any combination of one or more programming languages. The program codes may be provided to a processor or a controller of a general purpose computer, a special purpose computer, or other programmable data processing apparatus, such that the program codes, when executed by the processor or controller, enable functions/operations specified in the flowchart and/or the block diagram to be implemented. The program codes can be executed entirely on a machine, partially on a machine, partially on a machine and partially on a remote machine as a stand-alone software package, or entirely on a remote machine or server.

In the context of the present disclosure, a machine-readable medium may be a tangible medium that may contain or store programs for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices or apparatuses, or any suitable combination of the foregoing. A more specific example of a machine-readable storage medium may include: an electrical connection based on one or more wires, portable computer disks, hard disks, Random Access Memories (RAM), Read Only Memories (ROM), an Erasable Programmable Read Only Memory (EPROM or flash memory), an optical fiber, a compact disk read only memory (CD-ROM), an optical storage device, a magnetic storage device, or any suitable combination of the above.

To provide interaction with a user, the systems and techniques described herein may be implemented on a computer having: a display device (e.g. a CRT (cathode ray tube) or LCD (liquid crystal display) monitor) for displaying information to a user; and a keyboard and a pointing device (e.g. a mouse or a trackball) through which a user can provide input to the computer. Other kinds of devices can also be used to provide interaction with users; for example, feedback provided to the user may be any form of sensory feedback (e.g. visual feedback, auditory feedback, or tactile feedback); and input from the user can be received in any form including an acoustic input, a voice input, or a tactile input.

The systems and techniques described herein may be implemented in a computing system (e.g., as a data server) that includes back-end components, or a computing system (e.g., an application server) that includes middleware components, or a computing system that (e.g., a user computer having a graphical user interface or q web browser through which a user can interact with embodiments of the systems and techniques described herein) includes front-end components, or a computing system including any combination of such back-end components, middleware components, or front-end components. The components of the system may be interconnected by digital data communication (e.g. a communication network) in any form or medium. Examples of communication networks include a local area network (LAN), a wide area network (WAN) and the Internet.

The computer systems may include a client and a server. The client and the server are generally remote from each other and typically interact with each other through a communication network. The relationship of the client and the server is generated by a computer program running on a respective computer and having a client-server relationship with each other. The server may be a cloud server, a server of a distributed system, or a server combined with a blockchain.

It should be understood that steps can be reordered, added or deleted using the various forms of processes shown above. For example, the steps recited in the present disclosure may be performed in parallel or sequentially or in a different order, as long as desired results of the technical solutions of the present disclosure can be achieved, and the present disclosure is not intended to be limiting.

The above specific embodiments do not limit the protection scope of the present disclosure. It will be apparent to those skilled in the art that various modifications, combinations, sub-combinations and substitutions may be made depending on design requirements and other factors. Any modifications, equivalent substitutions and improvements made within the spirit and principles of the present disclosure should be included within the protection scope of the present disclosure.

What is claimed is:

1. A product recognition method, comprising:
   obtaining image data of a product;
   performing defect recognition on the image data based on a first recognition model, to obtain a first recognition result, wherein the first recognition model is configured to recognize a defective product;
   performing qualification recognition on the image data based on a second recognition model, to obtain a second recognition result, wherein the second recognition model is configured to recognize a qualified product, and the second recognition model is a model obtained by unsupervised training;
   determining a target recognition result of the product based on the first recognition result and the second recognition result;
   adding the image data to a defect product database when the first recognition result indicates that the product is a qualified product and the second recognition result indicates that the product is a defective product, wherein data in the defect product database is configured to optimize the first recognition model.

2. The method according to claim 1, wherein determining the target recognition result of the product based on the first recognition result and the second recognition result comprises:
   determining that the target recognition result is the first recognition result or the second recognition result when the first recognition result is the same as the second recognition result;
   determining that the target recognition result is the first recognition result when the first recognition result indicates that the product is a defective product, and the second recognition result indicates that the product is a qualified product;
   determining that the target recognition result is a third recognition result when the first recognition result indicates that the product is a qualified product and the second recognition result indicates that the product is a defective product, wherein the third recognition result is a recognition result that a type of the product is pending.

3. The method according to claim 1, wherein the second recognition model is further configured to recognize the defective product, the first recognition model is a model obtained by training an initial recognition model based on image data of a target product;
   a recognition result obtained by recognizing the image data of the target product by the second recognition model is that the target product is the defective product;
   a recognition result obtained by recognizing the image data of the target product by the initial recognition model is that the target product is the qualified product, the initial recognition model is a model obtained by performing training based on image data of defective products.

4. The method according to claim 1, wherein the second recognition model is a model obtained by unsupervised training based on image data of qualified products.

5. The method according to claim 1, wherein the first recognition model comprises a first feature extraction layer, a first recognition layer and a second recognition layer, and an input end of the first recognition layer and an input end of the second recognition layer are connected with output ends of the first feature extraction layer;
   wherein the first feature extraction layer is configured to extract target features in the image data, and is configured to transmit the target features to the first recognition layer and the second recognition layer, respectively;
   the first recognition layer is configured to perform recognition based on the received target features and output a defect location in the image data and output a probability that the product is a defective product; the second recognition layer is configured to perform recognition based on the received target features and output contour information of defects in the image data.

6. The method according to claim 1, wherein the second recognition model comprises a second feature extraction layer, a third feature extraction layer, a fourth feature extraction layer, and a comparison layer, and the second feature extraction layer, the third feature extraction layer, and the fourth feature extraction layer are connected to the comparison layer;
wherein the second feature extraction layer, the third feature extraction layer, and the fourth feature extraction layer are respectively configured to perform feature extraction on the image data, and a scale of a feature extracted by the second feature extraction layer, a scale of a feature extracted by the third feature extraction layer, and a scale of a feature extracted by the fourth feature extraction layer are different; the comparison layer is configured to output a recognition result based on the feature extracted by the second feature extraction layer, the feature extracted by the third feature extraction layer, and the feature extracted by the fourth feature extraction layer.

7. A model training method, comprising:
obtaining image data of a product;
inputting the image data into an initial recognition model and a second recognition model for recognition, and obtaining a first recognition result outputted by the initial recognition model and a second recognition result outputted by the second recognition model, wherein the initial recognition model is a model for recognizing a defective product, and the second recognition model is a model for recognizing a qualified product, and the second recognition model is a model obtained by unsupervised training;
training the initial recognition model based on the image data to obtain a first recognition model, when the first recognition result indicates that the product is a qualified product and the second recognition result indicates that the product is a defective product.

8. The method according to claim 7, wherein training the initial recognition model based on the image data to obtain the first recognition model when the first recognition result indicates that the product is the qualified product and the second recognition result indicates that the product is a defective product comprises:
adding the image data to a defect product database;
generating first training data based on data in the defect product database;
performing supervised training on the initial recognition model based on the first training data, to obtain the first recognition model.

9. The method according to claim 8, wherein generating the first training data based on the data in the defect product database comprises:
obtaining first image data from the defect product database, wherein the first image data is any image data in the defect product database;
setting a defect type label to the first image data to obtain the first training data, when the first image data is reviewed and a reviewing result indicates that the first image data is the image data of the defective product.

10. The method according to claim 9, wherein after obtaining the first image data from the defect product database, the method further comprises:
reviewing the first image data, and when a result of the reviewing indicates that the first image data is the image data of the qualified product, determining that the first image data as image data that passes inspection.

11. The method according to claim 7, wherein before obtaining the image data of the product, the method further comprises:
obtaining second image data, wherein the second image data is image data of the qualified product;
inputting the second image data as training samples into a pre-constructed first initial model for unsupervised training, to obtain the second recognition model.

12. The method according to claim 7, wherein before obtaining the image data of the product, the method further comprises:
obtaining third image data, wherein the third image data is image data of the defective product;
setting a defect type label on the third image data to obtain second training data;
inputting the second training data into a pre-constructed second initial model for supervised training, to obtain the initial recognition model.

13. The method according to claim 11, wherein the model parameters of the first initial model match with model parameters of a pre-training model, the pre-training model is a model obtained from an open source dataset, or the pre-training model is a model obtained by self-supervised training based on artificial defect types.

14. The method according to claim 11, wherein in a process of inputting the second image data into the first initial model for unsupervised training, the first initial model is configured to extract the second image data to obtain a feature set, after inputting the second image data into the pre-constructed first initial model for the unsupervised training to obtain the second recognition model, the method further comprises:
extracting a to-be-recognized feature in test image data based on the second recognition model when the second recognition model receives the test image data;
determining that the test image data is image data of the qualified product when a distance between a feature in the feature set and the to-be-recognized feature is less than a preset value;
determining that the test image data is image data of the defective product when a distance between a feature in the feature set and the to-be-recognized feature is larger than or equal to the preset value.

15. The method according to claim 14, wherein the distance is a Mahalanobis distance or a Euclidean distance.

16. A product recognition device, comprising:
at least one processor, and
a memory communicatively coupled to the at least one processor, wherein the memory stores instructions executable by the at least one processor, and when the instructions are executed by the at least one processor, the at least one processor executes the product recognition method according to claim 1.

17. The product recognition device according to claim 16, wherein, determining the target recognition result of the product based on the first recognition result and the second recognition result comprises:
determining that the target recognition result is the first recognition result or the second recognition result when the first recognition result is the same as the second recognition result;
determining that the target recognition result is the first recognition result when the first recognition result indicates that the product is a defective product, and the second recognition result indicates that the product is a qualified product;

determining that the target recognition result is a third recognition result when the first recognition result indicates that the product is a qualified product and the second recognition result indicates that the product is a defective product, wherein the third recognition result is a recognition result that a type of the product is pending.

18. A model training device, comprising:

at least one processor, and a memory communicatively coupled to the at least one processor, wherein the memory stores instructions executable by the at least one processor, and when the instructions are executed by the at least one processor, the at least one processor executes the model training method according to claim 7.

19. A non-transitory computer-readable storage medium having stored therein computer instructions, wherein the computer instructions are configured to cause a computer to execute the product recognition method according to claim 1.

20. A non-transitory computer-readable storage medium having stored therein computer instructions, wherein the computer instructions are configured to cause a computer to execute the model training method according to claim 7.

* * * * *